(12) United States Patent
Anderson et al.

(10) Patent No.: US 7,533,330 B2
(45) Date of Patent: May 12, 2009

(54) REDUNDANCY FOR STORAGE DATA STRUCTURES

(75) Inventors: David Anderson, Minnetonka, MN (US); Sami Iren, Pittsburgh, PA (US); Xueshi Yang, Pittsburgh, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 634 days.

(21) Appl. No.: 11/167,774

(22) Filed: Jun. 27, 2005

(65) Prior Publication Data

US 2008/0010580 A1    Jan. 10, 2008

(51) Int. Cl.
*H03M 13/00* (2006.01)
(52) U.S. Cl. ............... 714/799; 714/48; 714/710; 714/711; 714/758; 714/763
(58) Field of Classification Search ............... 714/6, 714/710, 711, 763, 799, 48, 758
See application file for complete search history.

(56) References Cited

U.S. PATENT DOCUMENTS 7,302,632 B2 * 11/2007 Lamy et al. ............... 714/776
2006/0156059 A1 * 7/2006 Kitamura ................ 714/6

OTHER PUBLICATIONS

Banachowski, Scott A. et al., "Intra-file Security for a Distributed File System", Proc. of the 10th Goddard Conference on Mass Storage Systems and Technologies in cooperation with the 19th IEEE Symposium on Mass Storage Systems, College Park, MD, Apr. 2002, pp. 153-163.
Fang, Doug et al., "An Experimental Object-Based Sharing System for Networked Databases", The VLDB Journal, vol. 5, pp. 151-165, 1996.
Anderson, Dave, "You Don't Know Jack about Disks", Queue, vol. 1, Issue 4, Jun. 2003, pp. 22-30.
Mesnier, Mike et al., "Storage Area Networking: Object-Based Storage", IEEE Communications Magazine, Aug. 2003, pp. 84-90.
Riedel, Erik, "Object-Based Storage Devices (OSD) T10 Standard", Seagate Research, Nov. 2003.
Merryman, John, "The Object is Better Backup", Storage Magazine, May 2004 (web printout).
Newman, Henry, "Storage Focus: File System Fragmentation", EnterpriseStorageForum.com, May 21, 2004 (web printout).

(Continued)

*Primary Examiner*—Esaw T Abraham
(74) *Attorney, Agent, or Firm*—Westman, Champlin & Kelly, P.A.; R. Michael Reed

(57) ABSTRACT

A storage device comprising has a storage medium, a read-write mechanism, an object-based file system interface, and a controller. The read-write mechanism is adapted to read and to write data from and to the storage medium. The object-based file system interface within the storage device is adapted to organize and access data on the storage medium as objects and to access attributes of each data object. The controller is adapted to generate redundancy data for each data object to be stored on the storage medium according to the associated attributes and to store the data object and its associated redundancy data on the storage medium.

17 Claims, 8 Drawing Sheets

OTHER PUBLICATIONS

Gibson, Garth A., "Object Storage: Scalable Bandwidth for HPC Clusters", LinuxClustersInstitute.org, pp. 1-19.

Anderson, Darrell C., et al., "Interposed Request Routing for Scalable Network Storage", ACM Transactions on Computer Systems, vol. 20, Issue 1, 14 pages.

Gibson, Garth A., et al. "Network Attached Storage Architecture", Communications of the ACM, vol. 43, Issue 11, pp. 37-45.

Nagle, David, et al. "The Panasas ActiveScale Storage Cluster—Delivering Scalable High Bandwidth Storage", Proceedings of the ACM/ IEEE SC 2004 Conference (SC '04)—vol. 00.

Zeng, Ling-Fang et al., "SOSS: Smart Object-Based Storage System", Proc. of the 3rd International Conference on Machine Learning and Cybernetics, Shanghai, Aug. 26-29, 2004, pp. 3263-3266.

Brandt, Scott A. et al., "Efficient Metadata Management in Large Distributed Storage Systems", 20th IEEE/11th NASA Goddard Conference on Mass Storage Systems and Technologies, San Diego, CA, Apr. 2003.

Xin, Qin et al., "Evaluation of Distributed Recovery in Large-Scale Storage Systems", 13th IEEE International Symposium on High Performance Distributed Computing, Honolulu, HI, Jun. 2004.

Wang, Feng et al. "OBFS: A File System for Object-Based Storage Devices", 21st IEEE/ 12th NASA Goddard Conference on Mass Storage Systems and Technologies (MSST2004), College Park, MD, Apr. 2004.

Samet, Hanan, "Object-Based and Image-Based Object Representations", ACM Computing Surveys, vol. 36, No. 2, Jun. 2004, pp. 159-217.

Kher, Vishal et al., "Decentralized Authentication Mechanisms for Object-Based Storage Devices", Proc. of the 2nd IEEE International Security in Storage Workshop (SISW '03), Washington, DC, Oct. 31, 2003. pp. 1-10.

Georgiev, Iliya K. et al. "An Information-Interconnectivity-Based Retrieval Method for Network Attached Storage", Association for Computing Machinery, Proceedings of the 1st conference on Computing Frontiers, Ischia, Italy, 2004, pp. 268-275.

Hu, Lee C., "ADS—A Handle-Based Storage Architecture under Grid Computing", 2003 IEEE 18th Annual Workshop on Computer Communications, Dana Point, CA, Oct. 20-21, 2003.

* cited by examiner

REDUNDANCY FOR STORAGE DATA STRUCTURES

CROSS-REFERENCE TO RELATED APPLICATION

None.

FIELD OF THE INVENTION

The present invention relates generally to data storage devices, and more particularly, to systems and methods for redundant protection of data structures stored on a storage device.

BACKGROUND OF THE INVENTION

Data stored on a hard disc can be vulnerable to errors. For example, data retrieval errors can result from disc media flaws, which prevent the data from being retrieved. Conventionally, on-disc redundancy schemes (such as cyclical redundancy check, and the like) protect all data equally well without any knowledge of the logical structure of the data being protected. Such schemes are typically concerned with protecting sectors on the storage medium without regard for the content of the sectors and without regard for how sectors may be related. However, to the end user, some data may be more important than other data. Moreover, it is important to protect the entire logical structure of the data (such as the file systems, metadata, and the like) or the entire data content of a storage device can be lost to the user. While losing one or more sectors of a user file may not be serious, losing the same number of sectors of metadata can cause the loss of an entire device, file system, or a significant number of files.

Some conventional systems utilize a redundant array of independent discs (RAID) to protect data. Typically, RAID systems store data redundantly on multiple discs, without regard for the boundaries or the content of any given data object (such as a file, a database, a record, and the like). If one sector of a disc fails, the data can be recovered and restored using the redundant data from another disc, thereby protecting all data equally. However, such systems do not typically protect against a second read failure. For example, if a RAID protected drive has failed and the subsystem encounters a read error in the process of re-building the data of the lost drive on a new unit, the error can result in loss of the entire file system. While failure to read or recover an individual file or some subset of the files might be tolerable, the loss of critical data (such as metadata), of critical objects, or of the entire file system could be catastrophic. Such secondary read failures cannot be overcome, without incurring significant cost and performance penalties. Moreover, RAID systems can be expensive, and the cost cannot always be justified.

Therefore, there is an ongoing need for systems and techniques that protect the logical data structures within storage systems. Embodiments of the present invention provide solutions to these and other problems, and offer other advantages over the prior art.

SUMMARY OF THE INVENTION

A storage device has a storage medium, a read-write mechanism, an object-based file system interface, and a controller. The read-write mechanism is adapted to read and to write data from and to the storage medium. The object-based file system interface within the storage device is adapted to organize and access data on the storage medium as objects and to access attributes of each data object. The controller is adapted to generate redundancy data for each data object to be stored on the storage medium according to the associated attributes and to store the data object and its associated redundancy data on the storage medium.

In one embodiment, the controller is adapted to store the data object and its associated redundancy data as separate file entities on the storage medium. In another embodiment, the controller is adapted to store the data object and its associated redundancy data as an object. In another embodiment wherein conventional sector-based redundancy schemes are not used, the controller is adapted to access the redundancy data each time a stored data object is accessed and to use the redundancy data to recover the data object if an error occurs.

In another embodiment, a method for providing redundant protection for data stored on a storage device is provided. Attributes of a data object to be stored on a storage medium of the object-based storage device are accessed using an object-based file system interface of the storage device. Redundancy data is generated from the data object based on the accessed attributes. Space is allocated for the data object and for the generated redundancy data on the storage medium using the object-based file system interface. The data object and the generated redundancy data are written to the allocated space on the storage medium using a read-write mechanism of the storage device.

Other features and benefits that characterize embodiments of the present invention will be apparent upon reading the following detailed description and review of the associated drawings.

DETAILED DESCRIPTION OF ILLUSTRATIVE EMBODIMENTS

Figure 1:
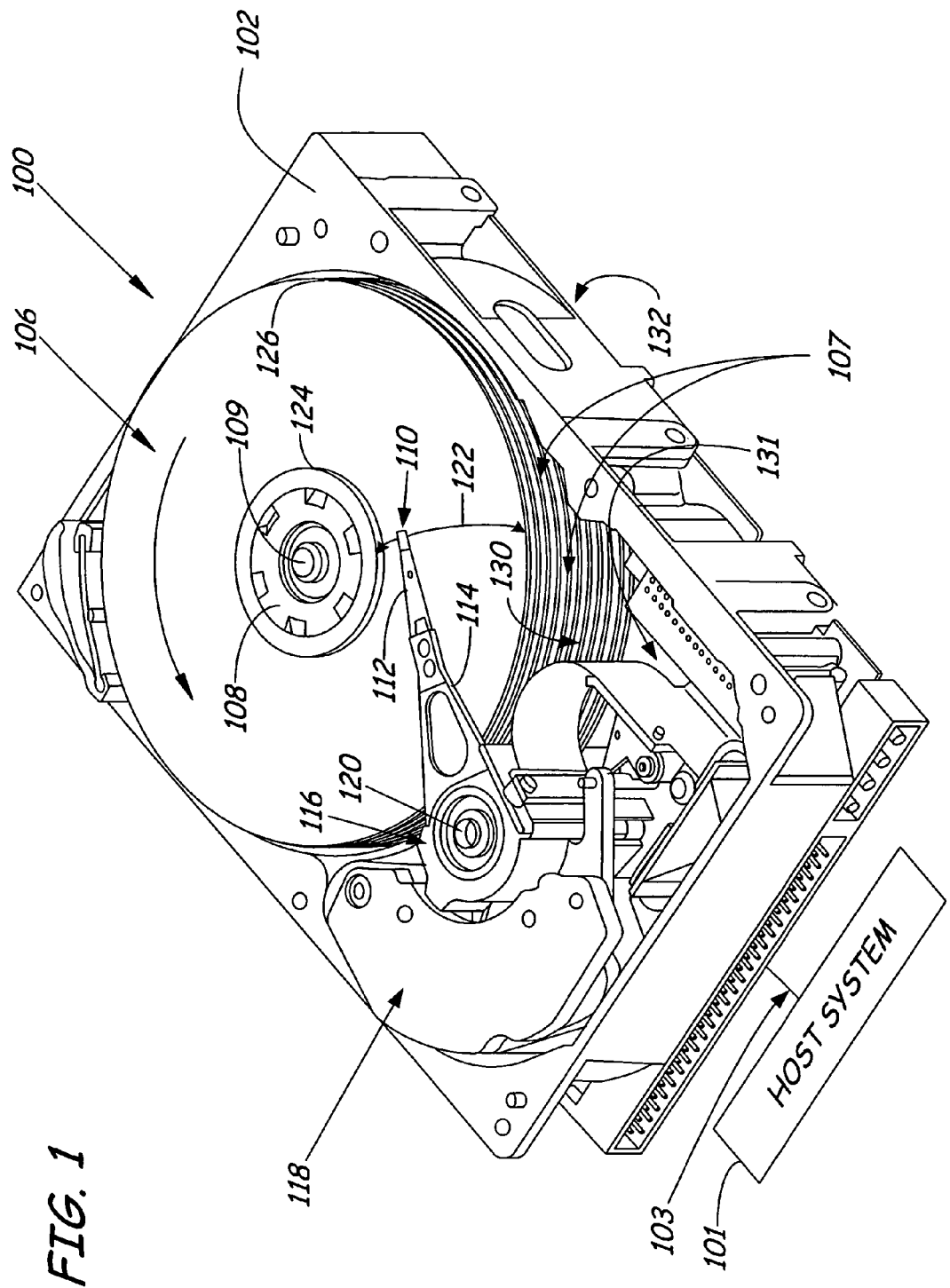
FIG. 1 is an isometric view of a disc drive on which embodiments of the present invention may be employed.

FIG. 1 is an isometric view of a disc drive 100 in which embodiments of the present invention are useful. Disc drive 100 includes a housing with a base 102 and a top cover (not shown). Disc drive 100 further includes a disc pack 106, which is mounted on a spindle motor (not shown) by a disc clamp 108. Disc pack 106 includes a plurality of individual discs 107, which are mounted for co-rotation about central axis 109. Each disc surface has an associated disc head slider 110 which is mounted to disc drive 100 for communication with the disc surface.

In the example shown in FIG. 1, sliders 110 are supported by suspensions 112 which are in turn attached to track accessing arms 114 of an actuator 116. The actuator shown in FIG. 1 is of the type known as a rotary moving coil actuator and includes a voice coil motor (VCM), shown generally at 118. Voice coil motor 118 rotates actuator 116 with its attached heads 110 about a pivot shaft 120 to position heads 110 over a desired data track along an accurate path 122 between a disc inner diameter 124 and a disc outer diameter 126. Voice coil motor 118 is driven by servo electronics 130 based on signals generated by heads 110 and a host computer 101 over interface 103. The disc drive 100 also includes a controller and/or custom logic in circuitry 131, which can be disposed, for example, along a lower surface 132 of the disc drive 100.

Figure 2A:
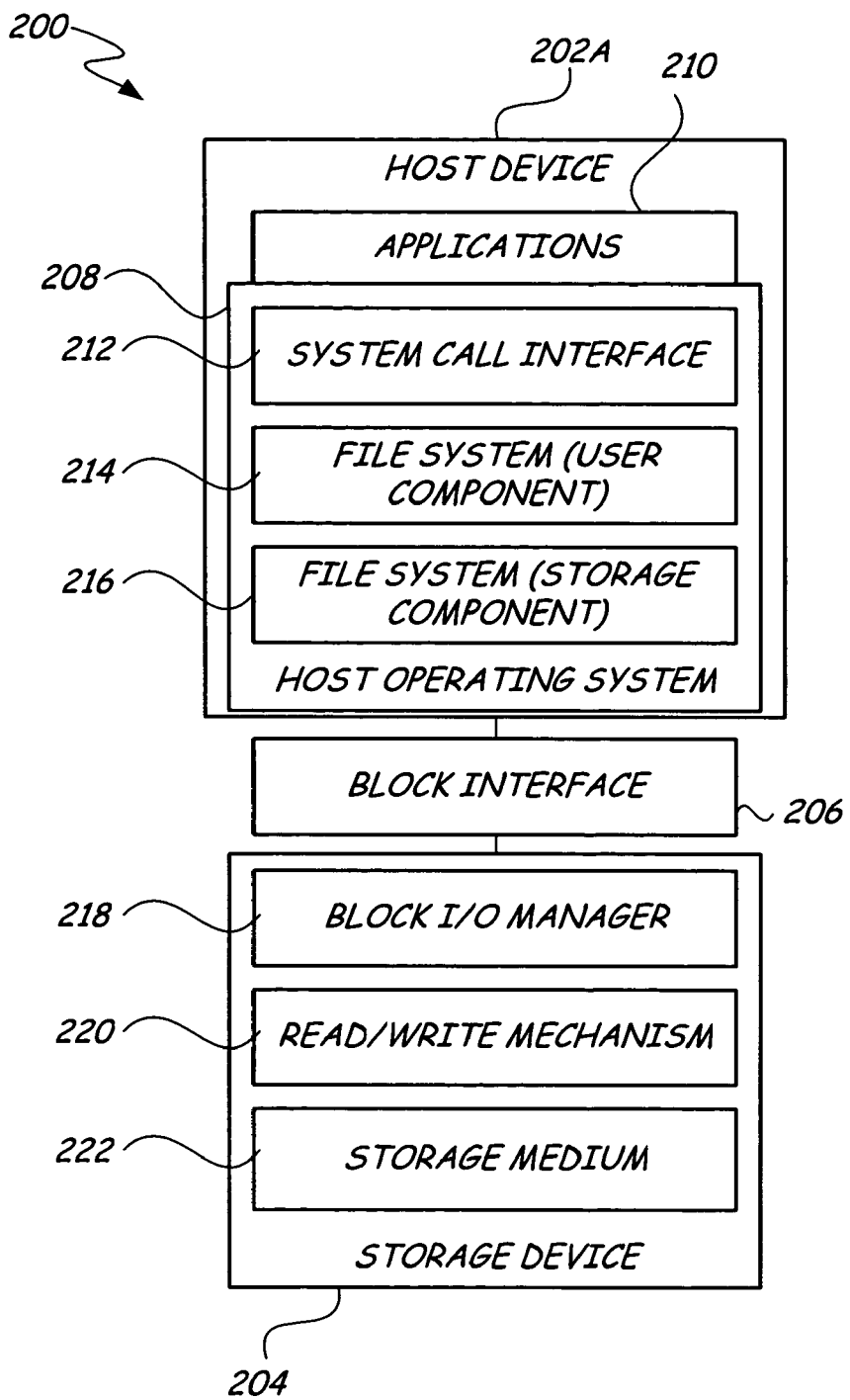
FIG. 2A is a simplified block diagram of a conventional storage device model.

FIG. 2A is a simplified block diagram of a conventional storage system according to an embodiment of the present invention. A conventional storage system 200 has a host device 202A (such as a computer) coupled to a storage device 204 by a block interface 206. The host device 202A has an operating system 208 (such as Microsoft® Windows®, Linux, or any other operating system) and one or more applications 210. In general, the operating system 208 includes a system call interface 212, a file system (user component) 214, and a file system (storage component) 216. The storage device 204 includes a block input/output (I/O) manager 218, a read/write mechanism 220, and a storage medium 222.

In general, the host device 202A is responsible for presenting user applications 210 with logical data structures using the file system (user component) 214, such as data files and directories, and a system call interface 212 for providing an interface for accessing these data structures. The file system (storage component) 216 maps the data structures to the storage device 204. The storage component 216 writes the data structure over the block interface 206 to the block input/output (I/O) manager 218, which uses the read/write mechanism 220 to write the data structure to the storage medium 222.

The present invention utilizes an object-based file system interface of an object-based storage device (OSD) to provide improved data protection by applying redundant protection to objects stored on the OSD. An OSD is a storage device with an object based file system interface by which data is organized and accessed as objects, rather than as data blocks. As used herein, the term object refers to a unit of information, including data and metadata. An object may also contain attributes and a method describing how the data content is to be interpreted and/or operated on. The term "file" as used herein refers to a set of similarly structured data records. The term "data structure" is used herein to refer to a logical ordering of data within a file or object. The term "metadata" as used herein refers to information about the data contained in a file or object. Metadata can include information about the content, quality, condition, and other characteristics of data. Metadata can also include a structured set of descriptive elements that describe an information resource, which can assist in the identification, location and retrieval of information resources by end-users. Objects can be logical collections of bytes on a storage device, with well-known methods for access, with attributes describing characteristics of the data, and with security policies that prevent unauthorized access. Objects may have different types of contents, such as data files, file systems, databases, and the like. Unlike data blocks that are typically of a fixed size, objects are of variable size and can be used to store various types of entities, including entire data structures, files, database tables, medical images, multimedia data, and the like.

Figure 2B:
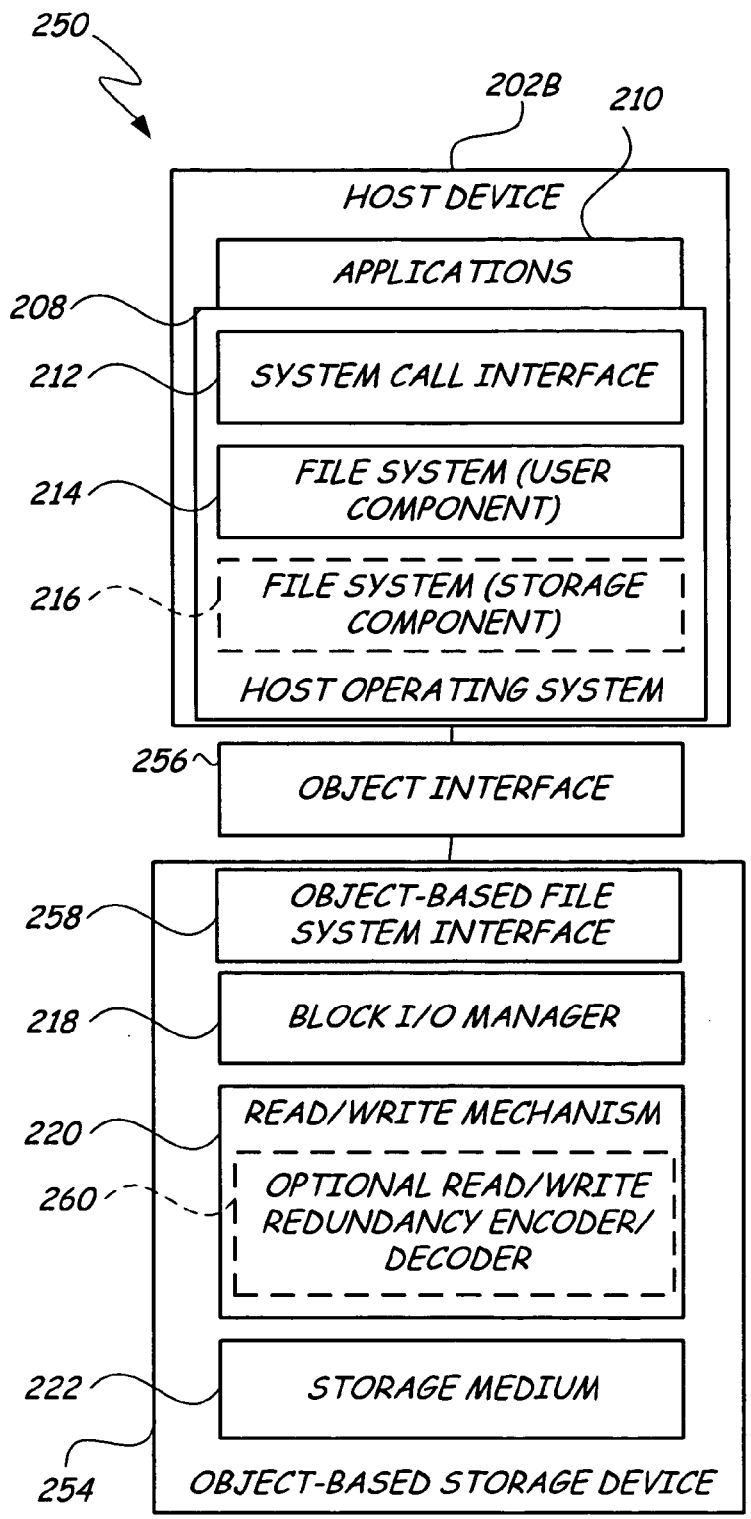
FIG. 2B is a simplified block diagram of an object-based storage device model according to an embodiment of the present invention.

FIG. 2B is a simplified block diagram of an object-based storage system 250 according to an embodiment of the present invention. The object-based storage system 250 includes a host device 202B and an object-based storage device (OSD) 254 communicatively coupled by an object interface 256.

In general, the host system 202B of storage system 250 is the same as the host system 202A of storage system 200. The host system 202 can be a computer or any device adapted to interact with the OSD 254. Like the host device 202A, host device 202B includes an operating system 208 and one or more applications 210. The operating system 208 generally includes a system call interface 212 and a file system (user component) 214. The operating system 208 can also include a file system (storage component) 216, which is shown in phantom in the host device 202B of storage system 250 to illustrate that the storage component 216 may be omitted, since the functionality has been moved to the OSD 254.

The OSD 254 is coupled to the host device 202B by an object interface 256. The OSD 254 includes an object-based file system interface 258, as well as the block I/O manager 218, the read/write mechanism 220, and the storage medium 222. Generally, a difference between the storage system 200 (of FIG. 2A) and the object-based storage system 250 (of FIG. 2B) is not the physical media, but rather the file system interface 258. In particular, the object-based file system interface 258 of OSD 254 includes space management functionality, including space allocation and tracking of used and free blocks on the storage medium 222. Thus, the space management functionality is moved onto the OSD 254, as compared to file system (storage component) 216 within the operating system 208 of storage system 200.

The OSD 254 stores objects of variable size, as opposed to fixed-sized data blocks. Data stored in each object are typically opaque to the object-based storage device and are simply stored in the data structure portion of the object (such as data structure 302 in FIG. 3C). Attributes stored within each object describe characteristics of the object, including information about the content of the object data. The attributes can be accessed and read by the object-based file system interface 258 of the OSD 254. For example, a quality of service (QoS) attribute can describe latency and throughput requirements for a multimedia object. The QoS attribute can be accessed by the object-based file system interface 258 to identify QoS requirements associated with the object, so that the object-based file system 258 can take steps to satisfy the QoS requirements. The device-managed metadata includes any additional information about the object that is maintained by the storage device for the purpose of managing the physical storage of the object. Stored objects are accessed using the object-based file system interface 258, which abstracts the storage applications from the metadata necessary to store the object. Since OSD 254 accesses the metadata, the OSD 254 is aware of the content and boundaries of stored objects and uses this information to handle the lower-level storage functions, such as block allocation, space management, and the like, which are traditionally part of the file system of the host. Thus, the OSD 254 knows the objects (entities) that are stored on the storage medium 222, and exactly where the pieces of the objects are located on the storage medium 222. Since objects can grow and shrink dynamically, the OSD 254 maintains the allocation and free-space metadata structures (such as UNIX index nodes, free-block bitmaps, and the like). The OSD 254 uses the file system (storage component) 258 within the OSD 254 to identify relationships (patterns) between objects written to the storage medium 222, and the OSD 254 can use this information to better organize the data. Moreover, the OSD 254 is adapted to treat objects with different levels of protection (redundancy) to objects and their sub-fields (sub-elements) using various redundancy schemes, based on a desired level of protection. For example, different redundancy algorithms can be applied to different types of data, such as metadata, important user data, and less important user data. Higher levels of protection can be applied to the metadata and to the important user data than to the less important user data. These different levels of protection can be applied in addition to traditional error correction schemes (such as sector-based Reed Solomon encoding/decoding) employed in conventional storage devices. For example, the OSD 254 can be adapted to employ traditional error correction schemes, in addition to the different levels of protection for objects and their sub-fields, by including an optional read/write redundancy encoder/decoder 260 within read/write mechanism 220.

By offloading the metadata onto the storage device 254, storage applications of the host device 202B can now store their structures as single objects as opposed to collections of blocks. Since the storage device 254 can treat objects individually, it is possible to set security policies and data storage redundancy policies on a per-object basis. The object interface 256 is similar to that of a file system. Objects can be created or deleted, read or written. Objects can be queried for particular attributes such as static information about the object (such as creation time, for example), dynamic information that is updated each time the object is accessed (such as last access time), application specific information (such as file name, group, and the like), and user information (such as a user identifier). Attributes can also contain information about the object, such as an expected read/write ratio, likely access patterns (such as sequential or random), expected object lifetime, and the like, which the OSD 254 can use to better organize the data on the storage medium.

An OSD 254 can be a single disc drive, an array of disc drives with a storage controller, a flash memory, or any other type of storage device. Additionally, an OSD 254 does not need to be a random access or even a writable storage device. Tape drives and various optical media can also be storage devices for the purpose of storing objects. In each instance, the OSD 254 can be adapted to apply different levels of redundancy to different objects or their sub-fields (elements) based on a desired level of protection.

In one embodiment, an OSD-based redundancy scheme can replace sector-based error protection (such as sector-based Reed-Solomon coding). In this instance, the OSD 254 can be adapted to generate redundancy fields for an object whenever the object is accessed, whenever a change is made to the object, and whenever the object is stored, for example.

While the above-example of an OSD 254 is described with respect to an object-based file system interface 258, it should be understood that this interface 258 can be an interface between a host device 202B and the storage device 254 (as shown) or it can be a file server interface. For example, if the OSD 254 is implemented as a stand-alone device on a network, the OSD 254 is adapted to provide redundancy/error correction for objects stored on the OSD 254 received or accessed from the network.

Figure 3A:
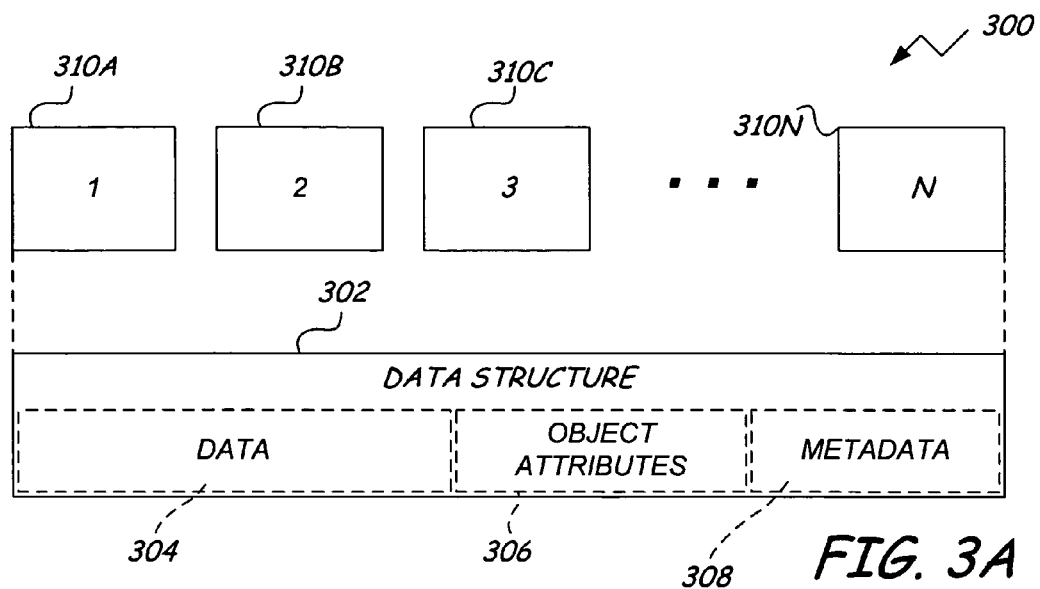
FIG. 3A is a simplified block diagram of a data object according to an embodiment of the present invention.

FIG. 3A illustrates a simplified block diagram of data stored on a storage medium according to an embodiment of the present invention. Generally, data is written to a storage medium according to the file system or data organization method governing the medium. In most systems, data is managed by means of various data structures. User data is usually stored in objects, files, or databases. An object can contain one or more files, databases, database records, and the like. Disc free space is typically maintained in a non-file structure, such as free block lists, file allocation tables (FATs), and the like. Any of these types of data structures, as well as other organizations of data, are candidates to be made more reliable by embodiments of the present invention.

The data object 300 includes data organized as a data structure 302 comprised of n-elements (or sub-fields) 310. Generally, the data structure 302 includes data 304, object attributes 306, and metadata 308. The data structure 302 can be divided into n-elements 310, each of which is separately readable or writable from and to the storage medium. In one embodiment, the n-elements 310 represent only the object attributes 306 and the metadata 308. In another embodiment, the n-elements 310 represent only the metadata 308. The elements are illustrated as 310A, 310B, 310C, through 310N to indicate that any number (n) of elements can make up a data structure 302.

The OSD (such as OSD 254 in FIG. 2B) can be adapted to apply redundancy schemes in order to provide additional protection to data structures 302. For example, a controller of the OSD can be adapted to generate redundancy data associated with a data object and to store the redundancy data and the data object on a storage medium. In one embodiment, the redundancy data can be stored in allocated storage space that is adjacent to or near the stored object. In an alternative embodiment, redundancy data can be stored in a different sector or at another location on the storage medium, so that if the storage medium is damaged in the proximity of the stored object, the object may still be recovered from the redundancy data. The redundancy data is preferably based on the content of the data object and can be used to reconstruct the data structures in the event of a read failure. This allows for the reconstruction of lost data without requiring complete hard disc module redundancy (such as with a RAID system). In the absence of a RAID storage device, metadata or data files can be read even after a read failure. Embodiments of the present invention can also be used to enhance a RAID subsystem by providing a means for recovering data from a read failure, thereby preventing loss of the file system. For example, a redundancy algorithm can be applied by the OSD to important user data, to file system objects, to metadata, and the like, to provide object-based redundancy, in addition to sector-based and RAID type redundancy.

Figure 3B:
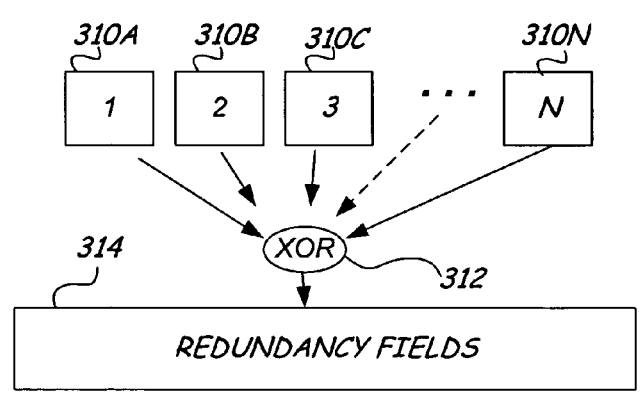
FIG. 3B is a simplified block diagram of a logical algorithm for generating a redundancy field according to an embodiment of the present invention.

FIG. 3B illustrates a simplified block diagram of a logical parity operation for calculating redundancy fields according to an embodiment of the present invention. In general, a parity operation 312 can be used to calculate redundancy fields 314 from the bit values of the n-elements 310A, 310B, 310C through 310N. In one embodiment, the parity operation is an exclusive- or operation (as illustrated by XOR element 312), which operates on the bit values to create values of the redundancy fields 314.

Figure 3C:
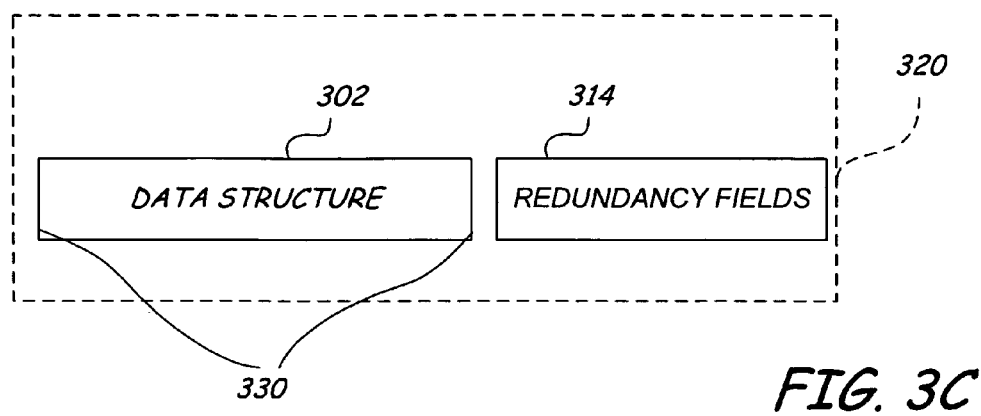
FIG. 3C is a simplified block diagram of the data structure of FIG. 3A with the redundancy fields appended that were generated by the algorithm of FIG. 3B according to an embodiment of the present invention.

FIG. 3C illustrates a simplified block diagram of a portion of a storage medium 320 on which a data structure 302 and its associated redundancy fields 314 are stored as separate file entities. In one embodiment, the redundancy fields 314 are stored in a different location on the storage medium 320 from the data structure 302. The redundancy fields 314 and the data structure 302 are preferably stored as separately accessible information units. If there is an error in reading the data structure from the storage medium 320, the redundancy fields 314 can be accessed by the OSD and utilized to reconstruct the data structure 302. In general, the OSD is adapted to make use of information relating to the logical boundaries 330 of the data structure 302 in generating the redundancy fields data and in allocating space on storage medium 320.

Embodiments of the present invention also allow specialized redundancy schemes to be applied on different data structures for improved protection or performance. For example, critical metadata can be protected with improved (but possibly costly) redundancy schemes that can recover from more serious read errors. When performance is more important than high reliability (as in the case of some personal video recorder applications), faster (but less efficient) redundancy schemes can be used on those data structures. Important user data can be protected with higher-level redundancy schemes than less important user data, and so on. Thus, multiple redundancy algorithms may be used on different data objects within the same storage device, and selection of a particular redundancy algorithm from a plurality of available algorithms can be based on information about the object, including attribute information. Moreover, different redundancy algorithms can be applied to sub-elements or sub-fields of a single data object, according to a desired level of error protection (for example, a different selected redundancy algorithm can be applied to each respective sub-element or sub-field of the data object according to a desired level of error protection and reliability).

Figure 3D:
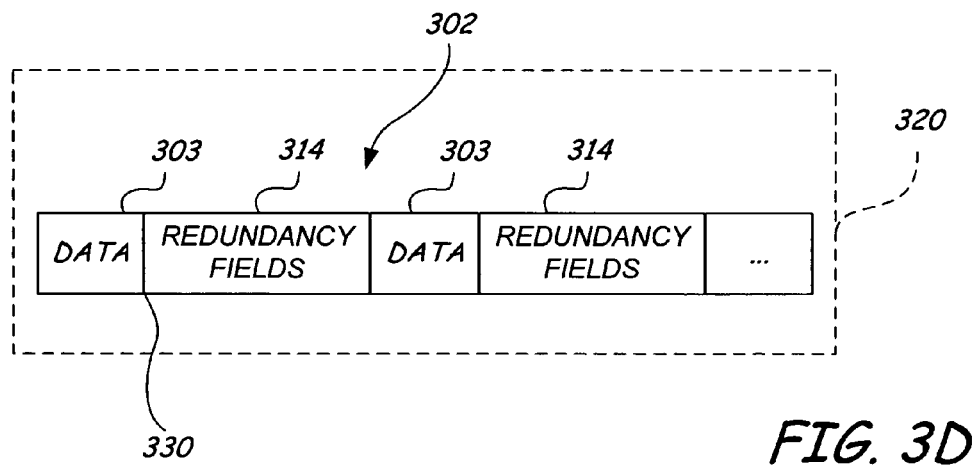
FIG. 3D is a simplified block diagram of an encoded data structure according to an alternative embodiment of the present invention.

FIG. 3D is a simplified block diagram of an encoded data structure 302 wherein the data 303 are interleaved with redundancy fields 314 on storage medium 320 according to an alternative embodiment of the present invention. In general, the OSD can be adapted to replace conventional read/write redundancy encoding/decoding. For example, in this embodiment the OSD is adapted to interleave the redundancy fields 314 with the data 303 to form an encoded data structure 302. The n-data elements 303 can be interleaved with redundancy fields 314 such that logical boundaries 330 are maintained.

Figure 4:
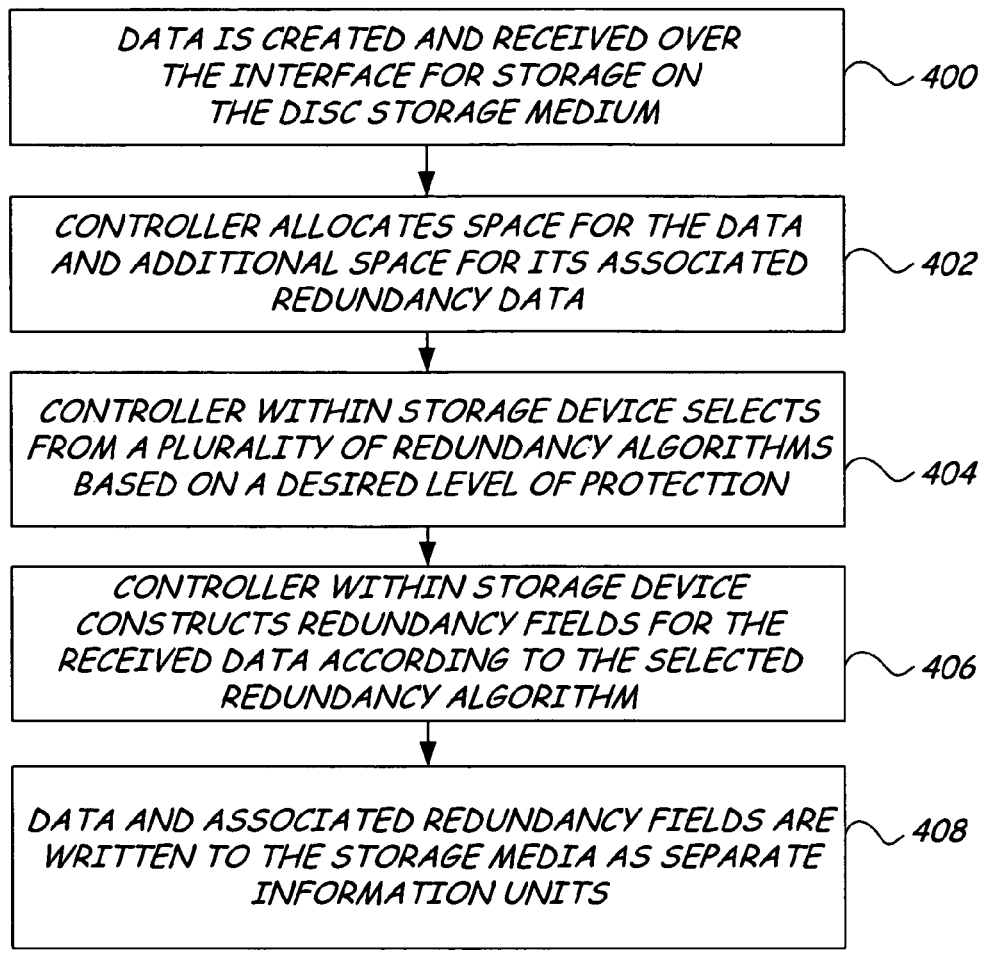
FIG. 4 is a simplified flow diagram of a process for generating and storing redundant data according to an embodiment of the present invention.

FIG. 4 is a simplified flow diagram a process for creation of redundancy fields associated with a data object according to an embodiment of the present invention. The user creates data and saves the data from an application on the host system. The data is received over the interface for storage on the disc storage medium (step 400). A controller of the storage device allocates space for the data and additional space for its associated redundancy data (step 402). A controller within the storage device selects a redundancy algorithm from a plurality of redundancy algorithms based on a desired level of protection (step 404). The controller can, for example, select the redundancy algorithm based on information contained in the attributes of the object to be stored. In one embodiment, an operator can specify a level of error protection within the attributes of the object, and the controller can use the specified level to select an appropriate redundancy algorithm. The controller constructs redundancy fields based on the received data according to the selected redundancy algorithm (step 406). Finally, the data object and associated redundancy fields are written to the storage media as separate information units (step 408). In general, it should be understood that the redundancy fields (redundancy data) are not accessible to applications, but rather are used by the controller of the OSD to provide a certain level of reliability. If a stored object is damaged, the OSD uses the redundancy data to fix (recover) the damaged object for use by an application.

It should be understood that the systems and methods of the present invention can be adapted to apply selected redundancy algorithms to each object (or sub-elements of an object) each time the object is accessed, changed, and/or stored. For example, as updates are made to the data structure, the redundancy data is also updated and written. Optionally, for high performance, the redundancy data for data structures that are updated frequently (such as metadata) can be loaded and updated in the memory to eliminate the need to write through the disc frequently. Idle disc cycles can be used to push the updated redundancy data to the disc. If a read error occurs on the redundancy protected data, the redundancy fields can be employed to reconstruct the lost data.

The OSD is adapted to provide protection based on logical object boundaries, rather than sector by sector. Since the OSD is aware of the boundaries of the object to be stored, the OSD can use the boundary information as well as information about the object to select among available redundancy schemes that provide, for example, different levels of protection. The quality of the protection can be adjusted based on what is being protected (metadata, important user data, less important user data, and so on). The selection of a redundancy scheme, the application of the selected redundancy scheme, and the recovery of damaged documents using the redundancy information is handled dynamically by the OSD. Embodiments of the present invention utilize attributes associated with an object to determine a level of error protection for the object and/or its sub-elements or sub-fields. Since the OSD bases its error protection on attributes associated with the data object, an operator or user can specify a preferred level of protection through the attributes of the data object. Thus, the attributes provide a mechanism whereby users can indicate their preference of protection level/quality for each object. In an alternative embodiment, the application of the redundancy scheme is entirely transparent to the user.

Figure 5:
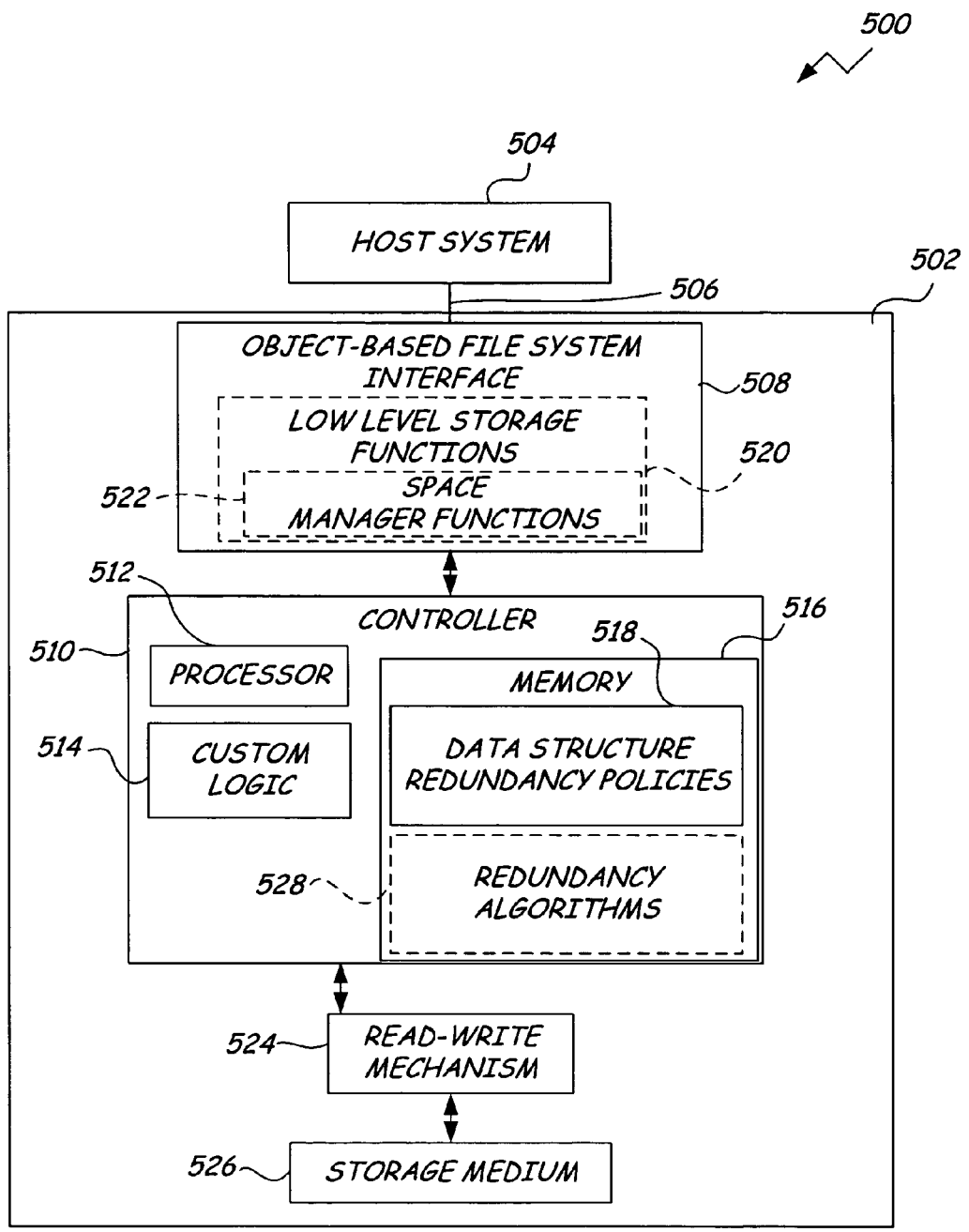
FIG. 5 is a simplified block diagram of a system adapted for redundant storage of data structures according to an embodiment of the present invention.

FIG. 5 is a simplified block diagram of a system 500 for redundant storage of data structures according to an embodiment of the present invention. System 500 includes a storage device 502 coupled to a host system 504 via an interface 506. The storage device 502 includes an object-based file system interface 508, a controller 510, a read-write mechanism 524, and a storage medium 526. The object-file system interface 508 can include low-level storage functions 520, such as space manager functions 522. The controller 510 can include a processor 512, custom logic 514, memory 516, a plurality of redundancy policies 518, and optionally a plurality of redundancy algorithms 528. Additionally, the object-based file system interface 508 can be integrated with the controller 510.

Generally, the object-based file system interface 508 abstracts low-level storage functions 520 including space manager functions 522. In particular, the object-based file system interface 508 manages metadata, manages low-level data storage tasks (such as access request scheduling, data layout, and the like), and provides a simple object-based data access interface for host systems 504 attached by interface 506. The object-based file system interface 508 has access to non-opaque attributes and generates metadata associated with received objects. Thus, the object-based file system interface 508 is aware of the content to be stored on the storage medium 526. The interface 506 may be a network interface or a standard storage device interface, such as advanced technology attachment (ATA) or small computer systems interface (SCSI).

In general, the object-based file system interface 508 receives data for storage on the storage medium 526. Data objects transmitted over the interface 506 are received by the object-based file system interface 508. The object-based file system interface 508 allocates space on the storage medium 526 for each data object, and can generate the metadata for each data object based on the allocated space and the non-opaque attributes of the data object. The metadata can then be provided to the controller 510 and processed according to the plurality of redundancy policies 518, which are stored in the memory 516. The controller 510 calculates the redundancy data, which is associated with the data objects. Additionally, the object-based file system interface 508 allocates additional space on storage medium 526 for the redundancy data before the data object and its associated redundancy data are written by the read-write mechanisms 524 to the storage medium 526.

Generally, the controller 510 generates redundancy fields from the elements of the data object. Low level storage functions 520, space manager functions 522, and the object-based file system interface 508 can be integrated into the controller 510 or can be separate elements, depending on the specific implementation. Alternatively, such elements may be integrated into custom logic 514.

In one embodiment, a plurality of redundancy algorithms 528 can be stored in memory 516. The controller 510 can be adapted to select a redundancy algorithm from the plurality of redundancy algorithms 528 based the redundancy policies 518 and/or based on a judged importance of the data object being stored. For example, if the data object includes important user data or metadata, a redundancy algorithm can be selected that has a higher level of data protection relative to other redundancy algorithms of the plurality of redundancy algorithms. Alternatively, data objects and their sub-fields can be processed using different redundancy algorithms, thereby generating a data object redundancy field and sub-field redundancy fields having different levels of protection. In general, the redundancy policies 518 can define a set of procedures for processing data objects for redundant storage, which can be used by the controller 510 for redundant data storage and retrieval.

Figure 6:
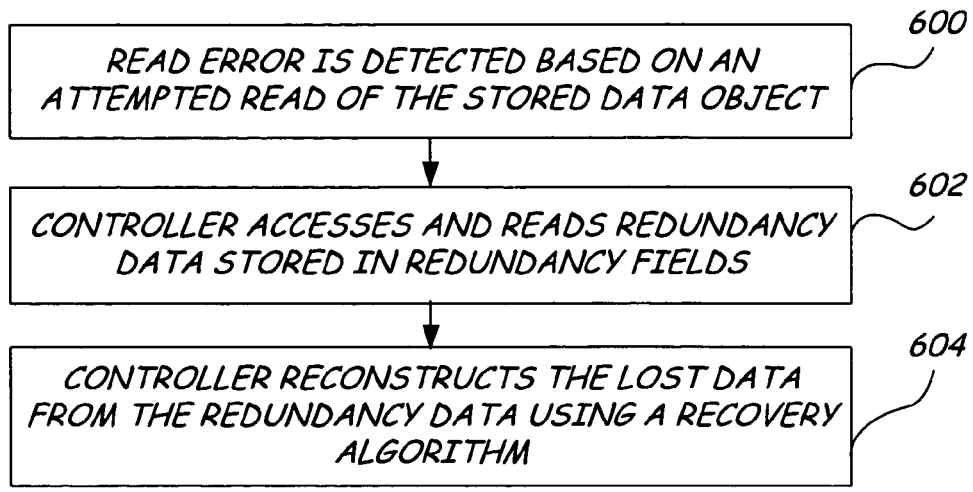
FIG. 6 is a simplified flow diagram of a process for recovering a stored data object based on the redundant field data according to an embodiment of the present invention.

FIG. 6 is a simplified flow diagram of a process for recovering lost data in the event of a read error using the redundancy field data according to an embodiment of the present invention. A read error is detected based on an attempted read of the stored data object (step 600). The controller accesses and reads the redundancy data associated with the stored data object from the redundancy fields on the storage medium (step 602). The controller reconstructs the lost data object using the redundancy data and a recovery algorithm (step 604). In general, the recovery algorithm depends on the redundancy algorithm.

Figure 7:
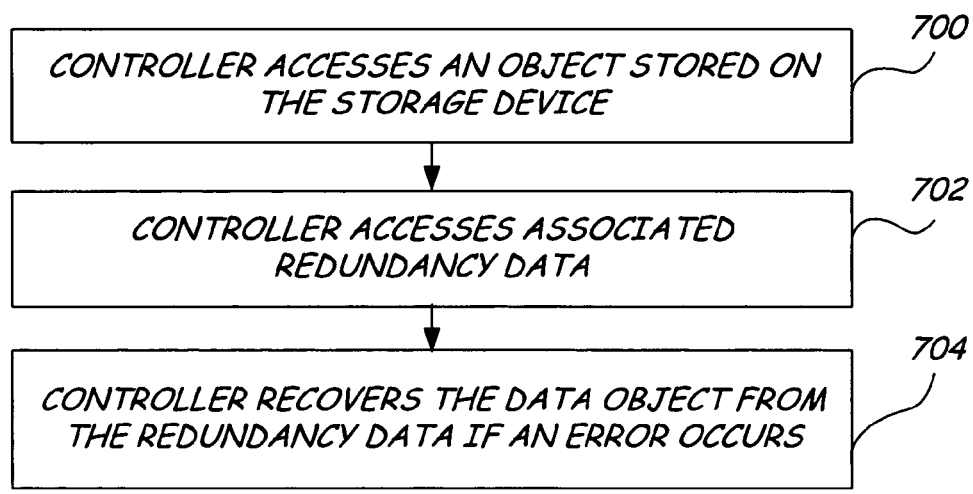
FIG. 7 is a simplified flow diagram of a process for recovering a stored data object based on the redundant field data according to an alternative embodiment of the present invention.

FIG. 7 is a simplified flow diagram of an OSD redundancy scheme according to an embodiment of the present invention for providing data redundancy and recoverability in an OSD that does not include standard sector-based error protection. For example, based on an access request received from an application of a host device (such as a computer), the controller accesses an object stored on the storage device (step 700). Additionally, the controller accesses the redundancy data associated with the accessed object (step 702). If an access or read error occurs (or if an error is encountered), the controller recovers the data object from the accessed redundancy data (step 704). It should be understood that, if no read or access error is encountered, the controller is adapted to update the redundancy data. For example, information about the date and time of access and information about any changes made to the object can be used to modify the redundancy data, and the modified redundancy data can be stored on the storage medium. In one embodiment, the controller is adapted to overwrite the existing redundancy data with the modified redundancy data on the storage medium. In another embodiment, the controller creates a new redundancy object in a different location on the storage medium each time a data object is changed and/or written to the storage medium, thereby establishing a versioning and redundancy scheme that can be used both to recover lost data and to track changes to the stored object. Earlier versions of an object could be recreated from the respective version of the redundancy data as desired.

While the recovery and storage of redundancy data has been described generally with respect to data objects to be stored, the present invention can be adapted to selectively apply one or more redundancy algorithms to data. For example, in one embodiment, the present invention can be adapted to store non-critical (user) data on the storage medium with its associated redundancy data, calculated by the controller using a first level redundancy algorithm. The controller can be further adapted to store critical data (such as metadata) on the storage medium with its associated redundancy data using a second level redundancy algorithm. In this instance, the second level redundancy algorithm can utilize more rigorous error checking and recovery schemes than the first level redundancy algorithm. In an alternative embodiment, the storage device can be adapted to utilize the standard sector-based redundancy scheme for all data and to apply an object based redundancy algorithm only to metadata objects. In this case, the redundancy data can be utilized to recover the metadata objects, which can prevent loss of the entire disc or file system.

The present invention provides a number of advantages over conventional storage systems. First, the redundancy methods are applied at a logical level (object-level), making the redundancy much more efficient. For example, the redundancy scheme can cover arbitrary amounts of data, such as individual objects, rather than a predefined relationship (such as all data in a sector) such as that offered by RAID devices. Second, the redundancy method can be applied to just those data structures for which it can be justified. In other words, not every data object or data structure that is stored on the storage medium needs to be protected by redundancy data. Third, different redundancy methods/levels can be applied to different data structures, depending on the level of need of protection. Thus, embodiments of the present invention provide a smarter protection mechanism that can be tailored for performance or reliability depending on the needs of the data structure and the user. Specifically, rather than treat all data on the storage device as equal, the present invention can utilize stronger error checking techniques or redundancy schemes on metadata or on important user data than on other less important objects, thereby providing greater protection for more critical data.

While conventional redundancy schemes assume random data, the present invention need not make such an assumption. In particular since the present invention is a content-aware device, the systems and methods of the present invention can use content-aware redundancy schemes on data structures. Such schemes utilize knowledge of the data type being stored and can be used to exploit the non-randomness feature of certain data types. The systems and methods of the present invention can also be used to enhance the reliability of RAID storage systems and other recovery systems and methods, by adding additional levels of protection for critical data (such as metadata). By supplementing the RAID storage systems with the content-aware, object-based redundancy fields described herein, the present invention prevents an error during re-building of the RAID set from destroying significant portions of the file system. Finally, the present invention provides a cost-effective means for preventing a non-RAID protective file system from being corrupted due to single read errors. Specifically, by providing redundancy fields with redundancy data associated with the actual data structure, a read error can be overcome by simply reconstructing the data object from the redundancy data stored in the redundancy fields. In this manner, a non-RAID protected file system provides the reconstruction/restoration advantages of a traditional RAID system without the additional costs.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the data structure redundancy system while maintaining substantially the same functionality without departing from the scope and spirit of the present invention. In addition, although the preferred embodiment described herein is directed to a object-based storage device system for appending associated redundancy fields to data structures based on the contents of the data structures, it will be appreciated by those skilled in the art that the teachings of the present invention can be applied to any type of storage system, including those containing traditional file systems, without departing from the scope and spirit of the present invention.

What is claimed is:

1. A storage device comprising:
   a storage medium;
   read write circuitry adapted to read and write data objects from and to the storage medium;
   an object-based file system interface within the storage device adapted to organize and access data on the storage medium as objects, the object-based file system interface adapted to access attributes associated with each data object; and
   a controller adapted to control access to the storage medium through the read-write circuitry, the controller adapted to selectively apply different levels of redundancy to generate redundancy data for each data object to be stored on the storage medium according to the associated attributes and to store the data object at a first allocated area on the storage medium and its associated redundancy data at a second allocated area on the storage medium;
   wherein the controller is adapted to selectively apply at least one redundancy algorithm to each data object to generate its associated redundancy data.

2. The storage device of claim 1 wherein the controller further comprises:
   a memory adapted to temporarily store changes to a stored data object when the stored data object is changed, wherein the controller is adapted to generate associated redundancy data based on changes to the data object and to store the generated redundancy data at a particular allocate area on the storage medium.

3. The storage device of claim 1 wherein, each time a particular data object is accessed, the controller accesses the associated redundancy data for the particular data object, the controller adapted to use the accessed redundancy data to recover the data object if an error is detected.

4. The object-based storage device of claim 1 wherein the controller is adapted to apply different redundancy algorithms to a particular object and its sub-fields for a desired level of protection according to the associated attributes of the particular object.

5. The object-based storage device of claim 1 wherein the controller is adapted to:
   select a redundancy algorithm from a plurality of redundancy algorithms based on at least one attribute of an object to be stored on the storage medium and to generate the redundancy data according to the selected redundancy algorithm.

6. The storage device of claim 1, wherein attributes comprise at least one of static information about the object, dynamic information that is updated each time the object is accessed, application specific information, and user information.

7. A storage device comprising:
   a storage medium;
   an object-based file system interface within the storage device adapted to access attributes of each data object and to derive information about contents of each data object from the accessed attributes, the object-based file system adapted to allocate space on the storage medium for a particular data object to be stored based on accessed attribute information and to allocate first space on the storage medium for storage of the particular data object and to allocate second space on the storage medium for storage of the redundancy data associated with the particular data object;
   read-write circuitry coupled to the storage medium adapted to read and write data objects from and to allocated space on the storage medium; and
   a controller adapted to:
      determine at least one desired level of error protection for the particular data object based on the accessed attributes;
      generate redundancy data for the particular data object to be stored on the storage medium according to the desired level of error protection; and
      control the read-write circuitry to store the particular data object at the first space and the generated redundancy data at the second space;
   wherein the controller is adapted to select different redundancy algorithms with different levels of data protection for data objects and their sub-fields according to a desired level of protection.

8. The storage device of claim 7 wherein the data object and its associated redundancy data are stored on the storage medium as separate entities.

9. The storage device of claim 7 further comprising:
   a memory coupled to the controller and adapted to store a plurality of redundancy algorithms;
   wherein the controller is adapted to select a redundancy algorithm from the plurality of redundancy algorithms based on an attribute associated with the particular data object to achieve the desired level of protection, the controller to apply the selected redundancy algorithm to generate the associated redundancy data.

10. The storage device of claim 7 wherein the storage device comprises a RAID storage system and wherein the associated redundancy data is stored across multiple discs of the RAID storage system.

11. The storage device of claim 7, wherein the controller selects a first redundancy algorithm to generate first redundancy data related to metadata of the particular data object and selects a second redundancy algorithm to generate second redundancy data related to other data of the particular data object, wherein the first redundancy algorithm provides a greater level of protection for data loss relative to the second redundancy algorithm.

12. A method for providing redundant protection for data objects stored on a storage device, the method comprising:

accessing attributes of a data object to be stored on a storage medium of an object-based storage device without accessing a data structure portion of the data object using an object-based file system interface within the object-based storage device;

selecting at least one redundancy algorithm from a plurality of redundancy algorithms to achieve a desired level of protection for a data object based on the accessed attributes;

generating redundancy data from the data object using the selected at least one redundancy algorithm by applying selected redundancy algorithms for desired error protection and reliability to the data object and its sub-elements according to the attributes of the data object;

allocating first and second spaces for the data object and for the generated redundancy data, respectively, on the storage medium using the object-based file system interface; and writing the data object to the first space and the generated redundancy data to the second space on the storage medium using read-write circuitry of the object-based storage device.

13. The method of claim 12 further comprising:

accessing the redundancy data each time the data object is accessed.

14. The method of claim 12 wherein before the step of generating, the method further comprises:

determining a desired level of protection for the data object based on the accessed attributes of the data object; and selecting the redundancy algorithm from a plurality of redundancy algorithms based on the desired level of protection.

15. The method of claim 12 wherein if the stored data object is later retrieved and modified, the method further comprising:

calculating modified redundancy data for the modified data object; and storing the modified data object and the modified redundancy data on the storage medium.

16. The method of claim 12 wherein the redundancy data provides a level of protection based on the logical boundary of each data object.

17. The method of claim 12, wherein selecting at least one redundancy algorithm comprises:

determining a first quality of service (QoS) associated with a first portion of the particular data object;

determining a second quality of service (QoS) associated with a second portion of the particular data object; and selecting a first redundancy algorithm based on the first QoS;

selecting a second redundancy algorithm based on the second QoS; and generating redundancy data for the first portion of the particular data object using the first redundancy algorithm; and generating redundancy data for the second portion of the particular data object using the second redundancy algorithm;

wherein the first and second portions and the first and second QoS are determined by accessing attributes of the data object.

* * * * *